United States Patent [19]

Brunie et al.

[11] 3,925,316

[45] Dec. 9, 1975

[54] PROCESS FOR THE PREPARATION OF MIXTURES OF CYCLOALKANOLS AND CYCLOALKANONES

[75] Inventors: Jean-Claude Brunie; Noel Creene, both of Lyon; Felix Maurel, Villeurbanne, all of France

[73] Assignee: Rhone-Poulenc S.A, Paris, France

[22] Filed: May 23, 1968

[21] Appl. No.: 731,634

[30] Foreign Application Priority Data
May 26, 1967 France .......................... 67.108082

[52] U.S. Cl. .... 260/586 R; 260/617 R; 260/617 M; 260/631 R
[51] Int. Cl.$^2$ .................. C07C 27/04; C07C 29/00; C07C 45/00
[58] Field of Search ........ 260/586 R, 617 R, 631 R

[56] References Cited

UNITED STATES PATENTS

| | | | |
|---|---|---|---|
| 3,096,376 | 7/1963 | Clement ............................. | 260/617 |
| 3,505,360 | 4/1970 | Allison et al ...................... | 260/586 |

*Primary Examiner*—Norman Morgenstern
*Attorney, Agent, or Firm*—Cushman, Darby & Cushman

[57] ABSTRACT

Solutions of cycloalkyl hydroperoxides in the corresponding cycloalkanes are decomposed to mixtures of cycloalkanols and cycloalkanoes by heating in the presence of, as catalyst, a soluble derivative of vanadium, molybdenum, or ruthenium.

4 Claims, No Drawings

PROCESS FOR THE PREPARATION OF MIXTURES OF CYCLOALKANOLS AND CYCLOALKANONES

This invention relates to the preparation of mixtures of cycloalkanols and cycloalkanones, and more especially relates to their preparation from the oxidised products, containing hydroperoxides, which arise from the oxidation of cycloalkanes by air or oxygen.

Aliphatic diacids are very important in their production of polycondensates such as polyesters and polyamides. Certain of these diacids are at present usually prepared by oxidative ring opening of cycloalkanols, or of mixtures of cycloalkanols and cycloalkanones, which are themselves prepared from cycloalkanes by various processes which all comprise an oxidation of the cycloalkane with air or oxygen. The oxidation starts with the formation of a hydroperoxide which may be decomposed at the rate at which it is formed or may conversely be decomposed, at least partially, in a second stage which is separate from the oxidation stage.

When the process is carried out in such a way as to cause decomposition of the hydroperoxide at the rate at which it is formed, a final mixture is obtained which consists mainly of cycloalkanol and cycloalkanone and which contains only relatively little hydroperoxide. The overall yield of the desired products in the process is rather unsatisfactory and a relatively large proportion of undesirable by-products is obtained.

Various solutions have been proposed for improving the yield and restricting this formation of undesirable products. These include: oxidation, in the presence of neutralising reagents for the acids formed during the reaction and considered to be responsible for the secondary reactions (French patent specification No. 886,795); and oxidation, in the presence of boric acid or anhydride (Belgian patent specification No. 635,117) or in the presence of boric esters (French patent specification No. 1,305,852), in which case the final product is a borate of a cycloalkanol which is liberated by hydrolysis or alcoholysis. These various procedures undoubtedly improve the process but involve complementary treatments which complicate the process.

It has also been proposed to decompose the hydroperoxide contained in solutions obtained by catalytic oxidation of the corresponding cycloalkane, by a subsequent treatment. This subsequent treatment may consist in heating the solution in the presence of a soluble catalyst derived from cobalt or chromium (British patent specification No. 777,087), but this process also yields a relatively large proportion of undesirable by-products.

It has also been proposed to carry out this subsequent treatment in the presence of granular catalysts (metals of group VIII, or molybdenum, vanadium and cobalt derivatives) deposited on carriers arranged in a fixed bed (see U.S. Pat. No. 2,851,496). However the viscous polycondensates, such as polyesters, which are formed both during the oxidation and during the deperoxidation, tend to become deposited on the catalyst bed and to encase the active substance. This result in a progressive deactivation of the catalyst, which considerably complicates its use in industrial processes of long duration.

The present invention provides a process for the preparation of mixtures of cycloalkanols and cycloalkanones from cycloalkanes, which is free of the disadvantages encountered in carrying out these known processes.

This process consists in heating a solution of a cycloalkyl hydroperoxide in the corresponding cycloalkane in the presence of, as catalyst, a soluble derivative of vanadium, molybdenum or ruthenium.

Any cycloalkane oxidation product containing a hydroperoxide may be treated by the new process, but of course the benefit of the new method of treatment is greater when dealing with oxidation products which have been prepared so as to cause the highest possible degree of formation of hydroperoxide, because in this case the proportion of undesirable products in the starting material is a minimum. Thus in practice it is generally more advantageous to start from an oxidation product obtained by the oxidation of a cycloalkane with air, without catalyst, optionally under pressure, with the temperature and degree of conversion being so chosen as to restrict the production of undesirable products as much as possible, and with the process of course being carried out in an apparatus which does not catalyse the decomposition of the hydroperoxide, which in the case of a steel apparatus presumes prior passivation of the steel, for example with pyrophosphates. When the oxidised product is specially prepared to produce the hydroperoxide, the oxidation is preferably stopped when the degree of conversion reaches about 4%, which generally corresponds to a cycloalkyl hydroperoxide content of the order of 2.5%, the remainder consisting of cycloalkanol, cycloalkanone and various by-products. Such oxidation products may be subjected to the deperoxidation treatment according to the invention, without further treatment. The oxidised product may also be brought to any desired concentration before being subjected to the deperoxidation treatment of the invention. Since, however, the reaction is exothermic it is of value not to use excessively concentrated solutions to avoid excessive evolution of heat which is prejudicial to obtaining good yields. In practice, there is no value in attempting to employ solutions of the oxidation products which have a higher total peroxide concentration than 15%. Since the oxidation is frequently carried out under pressure, a simple means of concentrating the oxidation product thus produced is to release the pressure on the hot oxidation product issuing from the oxidation apparatus. It is also rarely profitable to use solutions having a peroxide content below 1%.

The catalysts which may be used are derivatives of vanadium, of molybdenum and of ruthenium which have a solubility of at least 0.1 g/liter in the cycloalkane at ambient temperature. Suitable soluble catalysts include the naphthenates, the octoates, the stearates, the carbonyl derivatives, the chelated derivatives, and the esters of acids derived from these metals. The preferred forms are the naphthenates, the octoates and the acetylacetonates.

The amount of metal catalyst introduced may vary within wide limits but as a general rule satisfactory reaction speeds are obtained with amounts of metal of between 1 mg and 1 g per kg of peroxides contained in the solution subjected to the deperoxidation treatment.

The temperature may to a certain extent vary with the nature of the catalyst but is generally between 50°C. and 200°C. and preferably between 70°C. and 160°C.

To carry out the new process the solution of hydroperoxide containing the dissolved catalyst is raised to the appropriate temperature. Since the reaction is exothermic the temperature may thereafter be regulated by any system of regulation which is appropriate for removing the heat produced by the reaction. The duration of the deperoxidation treatment may vary from several minutes to several hours depending on the nature of the catalyst, on its amount, and on the temperature used. When the temperature used is above the boiling point of the mixture the reaction may be carried out in a suitable apparatus under pressure. The maintenance of the solution in the liquid phase may be ensured by introducing an inert gas such as nitrogen or argon under pressure into the apparatus. The cycloalkanol and the cycloalkanone resulting from the reaction may be separated from the final mixture by the usual methods, for example by distillation.

The new process may be applied to oxidation products of cycloalkanes having 5 to 16 carbon atoms in the ring and in particular to those arising from cycloalkanes having 6–12 carbon atoms in the ring. The process is of special value in the conversion of cyclohexane into mixtures of cyclohexanol and cyclohexanone. This process is very simple and lends itself to continuous industrial operation.

The following Examples illustrate the invention.

EXAMPLE 1

12 kg. of a cyclohexane solution containing 600 g. of cyclohexyl hydroperoxide, 160 g. of cyclohexanol and 78.3 g. of cyclohexanone are introduced into a stainless steel autoclave of 30 liters capacity. 1.93 g of vanadium naphthenate containing 4.5% by weight of metal are added to this solution, and nitrogen to a pressure of 15 bars is then introduced into the autoclave at 20°C. The solution is then raised to 150°C and kept at this temperature for 15 minutes. After cooling and degassing, the remaining mixture is distilled, and 505.2 g. of cyclohexanol and 251.7 g of cyclohexanone are obtained. 157 g of by-products containing 61.3% by weight of carbon remain.

The hydroperoxide used was propelled by the action of air of reduced oxygen content (13 to 14% of oxygen by volume) on cyclohexane at 170°–180°C. under a pressure of 18 bars in a stainless steel apparatus rendered passive with sodium pyrophosphate. The oxidation was stopped when 4% by weight of non-volatile products were present in the reaction medium. Concentration was effected by releasing the pressure on the solution as it leaves the oxidation apparatus. The yield of cyclohexanol and cyclohexanone based on the cyclohexane consumed during the 2 phases is 84.3%.

EXAMPLE 2

A solution consisting of 1900 g. of cyclohexane, 100 g. of cyclohexyl hydroperoxide and 0.4 g. of vanadyl acetylacetonate is introduced into a 3 liter flask topped by a distillation column. The solution is raised to boiling while the cyclohexane and the water which forms during the process are simultaneously distilled. The hydroperoxide is entirely decomposed at the end of 2 hours. The cyclohexane is then derived off and 35.8 g of cyclohexanone and 48.1 g. of cyclohexanol are then obtained by distillation. 10.1 g of by-products containing 60% by weight of carbon remain, corresponding to a consumption of 7.1 g of cyclohexane.

The yield of cyclohexanol and cyclohexanone based on the hydroperoxide is 98%. It is 92% based on the cyclohexane consumed.

EXAMPLE 3

The procedure of Example 2 is followed, using 1200 g. of a cyclohexane solution identical to that used in Example 1, and replacing the vanadyl acetylacetonate by 0.0103 g of ruthenium acetylacetonate. The hydroperoxide is entirely decomposed after 30 minutes boiling. The cyclohexane is then driven off and 53 g of cyclohexanol and 24.4 g of cyclohexanone are finally obtained. 23.2 g of by-products containing 58.3% by weight of carbon remain.

EXAMPLE 4

The procedure of Example 1 is followed, starting with 12 kg. of a cyclohexane solution containing 600 g. of cyclohexyl hydroperoxide, 206 g. of cyclohexanol and 96 g. of cyclohexanone, and replacing the vanadium naphthenate with 1.67 g of molybdenum naphthenate containing 5% by weight of metal. The deperoxidation is carried out by heating the whole to 150°C for 30 minutes. 443 g of cyclohexanol and 226.6 g of cyclohexanone are obtained.

The cyclohexane solution was prepared in the manner described in Example 1, the degree of conversion being however slightly above 4%.

We claim:

1. Process for the preparation of a mixture of a cycloalkanol and the corresponding cycloalkanone which comprises heating a solution of a cycloalkylhydroperoxide having 5 to 16 carbon atoms in the ring, in the corresponding cycloalkane, the solution containing, as catalyst, a soluble derivative of vanadium, molybdenum or ruthenium having a solubility of at least 0.1 grams per liter in the cycloalkane at ambient temperature.

2. Process for the preparation of a mixture of a cycloalkanol and the corresponding cycloalkanone which comprises heating a solution of a cycloalkylhydroperoxide having 5 to 16 carbon atoms in the ring in the corresponding cycloalkane, the solution containing, as catalyst, a naphthenate, octoate or acetylacetonate of vanadium, molybdenum or ruthenium.

3. Process according to claim 1 in which the cycloalkylhydroperoxide has 6 to 12 carbon atoms in the ring.

4. Process according to claim 1 in which the hydroperoxide is cyclohexyl hydroperoxide.

* * * * *